United States Patent [19]

Shepherd et al.

[11] Patent Number: 5,006,613
[45] Date of Patent: Apr. 9, 1991

[54] TRICOMPONENT POLYMER BLENDS OF POLY(ETHYLENE TEREPTHOLATE), POLY(ETHYLENE NAPHTHALATE) AND A COPOLYESTER

[75] Inventors: Freddie A. Shepherd; Ronald R. Light, both of Kingsport, Tenn.

[73] Assignee: Eastman Kodak Company, Rochester, N.Y.

[21] Appl. No.: 560,653

[22] Filed: Jul. 30, 1990

[51] Int. Cl.$^5$ .............................................. C08F 20/00
[52] U.S. Cl. .................................. 525/444; 525/445; 525/447
[58] Field of Search ........................ 525/444, 445, 447

[56] References Cited

U.S. PATENT DOCUMENTS

| 3,546,320 | 12/1970 | Duling et al. | 260/860 |
|---|---|---|---|
| 3,937,754 | 2/1976 | Shimotsuma et al. | 260/860 |
| 4,359,570 | 11/1982 | Davis et al. | 528/289 |
| 4,617,373 | 10/1986 | Pruett et al. | 528/288 |

OTHER PUBLICATIONS

General Electric Company Technical Bulletin #18A, "Stabilization of Recycled PET with Ultranox ® 626".
Derwent Abstract WPI Acc. No. 74-49569V/27 (JP 74/022957).
Derwent Abstract WPI Acc. No. 75-82341W/50 (JP 50074562).
Derwent Abstract WPI Acc. No. 81-45035D/25 (JP 56/049014).
Research Disclosure 28340 (Nov., 1987).
Research Disclosure 29410 (Oct., 1988).
Derwent Abstract WPI Acc. No. 72-44222T,27 (JP 72/024177).

Primary Examiner—Harold D. Anderson
Assistant Examiner—T. Mosley
Attorney, Agent, or Firm—Thomas R. Savitsky; William P. Heath, Jr.

[57] ABSTRACT

This invention concerns blends of poly(ethylene terephthalate), poly(ethylene naphthalate) and a compatibilizing amount of a copolyester which comprises (1) an acid component comprising repeating units of from about 10 to about 20 mole % terephthalic acid and about 80 to about 90 mole % naphthalenedicarboxylic acid, and (2) a glycol component comprising repeating units of ethylene glycol. Clear containers containing less than 10% haze produced from such blends are useful for a variety of packaging applications, particularly hot-fill food and beverage containers where good barrier and clarity are needed.

20 Claims, No Drawings

TRICOMPONENT POLYMER BLENDS OF POLY(ETHYLENE TEREPTHOLATE), POLY(ETHYLENE NAPHTHALATE) AND A COPOLYESTER

FIELD OF INVENTION

This invention concerns blends of poly(ethylene terephthalate) [PET], poly(ethylene naphthalate) [PEN] and a compatibilizing amount of a copolyester. Clear containers containing less than 10% haze produced from such blends are useful for a variety of packaging applications, particularly hot-fill food and beverage containers where good barrier and clarity are needed.

BACKGROUND OF THE INVENTION

Biaxially oriented containers constructed of PET by either injection stretch blow molding (single stage) or reheat stretch blow molding (two stage) processes have about 80° C. glass transition (Tg) temperature, about 5 cc-mil/100 in$^2$-24 hr-atm oxygen permeability coefficient at 30° C. and 68% RH, and have found wide use in food and beverage applications that do not require hot filling. The upper use temperature of these containers can be increased by heat setting techniques to provide some hot-fill capabilities, but even when heat-set, these PET containers may have limited upper temperature uses. Thus PET has enjoyed popularity in a large number of packaging applications, but does not meet the requirements of some specific food and beverage packaging applications.

PEN has been found useful for producing monolayer biaxially oriented containers having about 1.5 cc-mil/100 in$^2$-24 hr-atm oxygen permeability coefficient at 30° C. and 68% RH with Tg of about 125° C. by either single stage or two stage processes, and these containers will be useful for a variety of food and beverage applications requiring both good barrier to oxygen (and other gases) and hot-fill capabilities.

As the markets for polyester packaging materials have developed, the needs for materials having improved performance over that offered by PET has been recognized. While it is also recognized that these needs could be filled by a material such as PEN, there are areas where some improvement over PET is desired, but the performance (and expense) of PEN is not needed or desired. These market segments could be filled by packages produced from blends of PET/PEN which would have performance levels between the two pure components. However, to be useful for most applications a packaging material would normally be clear (for some uses good clarity is a requirement), and blends of PET/PEN are generally incompatible and produce opaque parts.

Some prior information on PET/PEN blends may be found in U.S. Pat. No. 3,546,320 (1970) assigned to Sun Oil Co., U.S. Pat. No. 3,937,754 (1976) assigned to Teijin, Ltd., Japanese Patents 72/24177 (1972), 81/49014 (1981), 74/22957 (1974), and 75/74652 (1975) all assigned to Teijin, Ltd. Further information may also be found in Research Disclosures 28340 (1987) and 29410 (1988).

It has now been found that clear compatible blends containing less than 10% haze of PET/PEN can be made through the use of a compatibilizing amount of a copolyester as hereinafter disclosed, thereby avoiding a significant amount of processing and the costs associated therewith.

SUMMARY OF THE INVENTION

This invention relates to tricomponent polymer blends containing PET, PEN and a compatibilizing copolyester. The blends of this invention are suitable for producing clear, biaxially oriented containers that are useful for food and beverage applications requiring good barrier and hot-fill capabilities. More specifically, the present invention is directed to a clear polymer blend containing less than 10% haze comprising (A) about 15 to about 80 weight % of poly(ethylene terephthalate),
(B) about 80 to about 5 weight % of poly(ethylene naphthalenedicarboxylate), and
(C) about 5 to about 15 weight % of a copolyester which comprises
   (1) an acid component comprising repeating units of from about 10 to about 20 mole % terephthalic acid and about 80 to about 90 mole % naphthalenedicarboxylic acid, and
   (2) a glycol component comprising repeating units of ethylene glycol, wherein the total mole % of acid component and glycol component in the copolyester are each 100 mole %.

DETAILED DESCRIPTION OF THE INVENTION

In the blends of the invention it is preferred that component (A) is present in an amount of about 35 to about 60 weight %, component (B) is present in an amount of about 30 to about 60 weight %, and that component (C) is present in an amount of about 5 to about 10 weight %.

The clear polymer blends of the present invention have less than 10% haze, preferably less than 5% haze. The haze value can be determined according to ASTM Procedure D1003-61.

Articles, e.g., containers such as 2-liter bottles, prepared from blends of polymers made in accordance with the invention have oxygen permeability values ranging from about 3.5 to less than about 1.75 cc-mil/100 in$^2$-24 hr-atm depending upon the amount of PEN in the blend. A 2-liter PET container has an oxygen transmission rate of about 100 ul/day. Thus, 2-liter containers prepared from the blends of the invention have an oxygen transmission rate of about 35 to about 96 ul/day at 68% relative humidity (RH) and at about 30° C. Furthermore, articles such as containers and film made from the blends of the present invention typically have a glass transition temperature (Tg) as measured by differential scanning calorimetry (DSC) of about 85° to about 111° C.

The PEN and PET polymers, as well as the copolyester of component (C), which are useful in the blends of this invention can be readily prepared using typical polyester polycondensation reaction conditions known in the art. They may be made by either batch or continuous processes to the final I.V. value desired. Examples of methods which may be employed to prepare PET, PEN, and compatibilizing copolyester useful in the present invention can be found in U.S. Pat. No. 4,617,373.

Either or both of the PET and PEN polymers may optionally be modified with up to 15 mol %, preferably up to 10 mol %, of one or more different dicarboxylic acids (i.e., different than a naphthalenedicarboxylic acid isomer(s) in the case of PEN and terephthalic acid in the case of PET) containing 4 to 36 carbon atoms, preferably 8 to 20 carbon atoms; and/or one or more different glycols (i.e., different than ethylene glycol) containing 3 to 20 carbon atoms, preferably 3 to 12 carbon atoms.

Typical modifying dicarboxylic acids for PEN include terephthalic, isophthalic, adipic, glutaric, cyclohexanedicarboxylic, azelaic, sebacic, fumaric, biphenyldicarboxylic, stilbenedicarboxylic, and the like. Typical examples of modifying glycols for PEN include 1,4-butanediol, 1,6-hexanediol, 2,2-dimethyl-1,3-propanediol, 1,4-cyclohexanedimethanol, and the like. The PEN polymers are preferably derived from 2,6-naphthalenedicarboxylic acid and also contain, optionally, up to about 25 mol % (preferably up to 15 mol %, most preferably up to 10 mol %) of one or more residues of different naphthalenedicarboxylic acid isomers such as the 1,2-, 1,3-, 1,4-, 1,5-, 1,6-, 1,7-, 1,8-, 2,3-, 2,4-, 2,5-, 2,7- or 2,8-isomers. PEN polymers based primarily on 1,4-, 1,5-, or 2,7naphthalenedicarboxylic acid are also useful.

Typical modifying dicarboxylic acids for PET include isophthalic acid, adipic acid, glutaric acid, azelaic acid, sebacic acid, fumaric acid, stilbenedicarboxylic acid, cyclohexanedicarboxylic acid, biphenyldicarboxylic acid, any of the isomers of naphthalenedicarboxylic acid, and the like. Typical modifying glycols for PET include 1,4.butanediol, 1,6-hexanediol, 2,2-dimethyl-1,3-propanediol, 1,4-cyclohexanedimethanol, and the like.

In similar fashion, the acid component and glycol component of the compatibilizing copolyester (i.e., component (C)) can each be modified with up to about 20 mole %, preferably up to 10 mole %, of one or more different dicarboxylic acids or glycols. The same modifying glycols and acids disclosed above for use with PET and/or PEN can be used to modify the compatibilizing copolyester.

The compositions of the present invention are suited for hot-fill food and beverage packaging applications. The particular overall blend composition desired can be determined by the barrier and thermal properties needed for end use requirements.

The blends of this invention can be prepared by standard blending techniques known in the polyester art.

The inherent viscosities (I.V.'s) of the polymers of the blends typically range from about 0.5 to about 1.0, preferably about 0.65 to about 0.75. I.V. can be determined in a 60/40 phenol/tetrachloroethane solution at 25° C. at a concentration of 0.5 g/100 ml.

The following examples are to illustrate the invention but should not be interpreted as a limitation thereon.

EXAMPLE 1

Two hundred eighty-five grams of powdered PET (I.V. - 0.72) were blended with 15 grams of powdered poly(ethylene 2,6-naphthalenedicarboxylate) [PEN], dried under a vacuum overnight and subsequently extruded into a 2 to 3 mil thick film on a small Brabender ® extruder equipped with a six-inch wide film die. The film had a haze value of >10% as measured according to ASTM D1003-61 and was determined to have an oxygen permeability coefficient of 11.1 cc-mil/100 in$^2$-24 hr-atm, a carbon dioxide permeability coefficient of 60.2 and a water vapor transmission rate of 3.7 g-mil/100 in$^2$-24 hr. The blend's thermal properties were measured on a Differential Scanning Calorimeter (DSC) and determined to have a glass transition temperature (Tg) on the second heating cycle of about 79° C. which is slightly higher than the Tg of the neat PET (75° C.) but lower than the Tg of the neat PEN (124° C.).

EXAMPLE 2

Two hundred seventy grams of powdered PET (I.V.-0.72) were blended with 30 grams of powdered PEN (I.V.-0.72) and treated in the same way as described in Example 1. Again the film had a haze value >10% but had one Tg (second heating cycle) at 81° C. which is between the Tg's of PET (75° C.) and PEN (124° C.). Then sample, as measured with MOCON's OXTRAN 100, PERMATRAN C and PERMATRAN W ®, permeability and water vapor transmission instruments, was found to have an oxygen permeability coefficient of around 10.6 cc-mil/100 in$^2$-24 hr-atm, a carbon dioxide coefficient of 47.5 cc-mil/100 in$^2$-24 hr.-atm and a water vapor transmission rate of 2.8 g-mil/100 in$^2$-24 hr.

EXAMPLE 3

Two hundred seventeen and eight tenths grams of PET powder were dry blended with eighty-two and two tenths grams of powdered PEN and processed in the same manner as described in Example 1. The 2 to 3 mil film produced had a haze value of >10% and a second heating cycle Tg of around 85° C. The oxygen permeability coefficient was determined to be about 7.9 cc-mil/100 in$^2$-24 hr-atm, the carbon dioxide permeability coefficient was measured to be 45.2 cc-mil/100 in$^2$-24 hr-atm and the water vapor transmission rate was measured at 2.9 g-mil/100 in$^2$-24 hr.

EXAMPLE 4

Pellet/pellet blends of PEN/PET (100/0, 75/25, 50/50, 25/75, and 0/100) were prepared and dried at 175° C. in a dehumidifier dryer (Conair ®, for example) for about 16 hours. These blends were then injection molded into 57 gram parisons with a Cincinnati Milacron ® 150-6 single cavity injection molding machine using a barrel temperature of about 315° C., injection pressure of about 1500 psi, back pressure of about 200 psi, screw speed of about 130 rpm, and cycle times of about 12 seconds. With these conditions the total shot size (parison and runner) was 75 grams with a residence time of 2 minutes, 45 seconds. The pure components gave clear parisons, but under these conditions the blends produced opaque parisons. The parisons were heated to between 120° to 150° C. parison outside surface temperature and 2-liter oriented bottles produced with a laboratory reheat stretch blow (RHB) unit. RHB bottles produced from these blends generally had good material sidewall distribution. The opaque bottles (produced with the PEN/PET, 74/25, 50/50, and 25/75 blends) had oxygen permeabilities that were median between pure PEN and PET bottles, with the bottles that were rich in PEN having the lower permeability coefficients.

EXAMPLE 5

Pellet/pellet blends of PEN/PET again were produced as described in Example 4, but this time pellets (10 weight % of the total blend weight) of a poly(ethylene naphthalate-terephthalate) copolymer containing about 15 mole % of the poly(ethylene terephthalate) moiety were added to the blend. After drying, these blends were injection molded into parisons as described in Example 4, and clear parisons containing <5% haze were obtained. This result indicates that having 10 weight % copolymer present in the blend will help compatibilize the mixture enough to produce clear injection molded parts. Oriented 2-liter bottles were produced from these parisons as described in Example 6 with similar oxygen permeability results. However, these RHB bottles had very poor sidewall material distribution as would be expected from stretching copolymers that have limited strain hardening characteristics.

EXAMPLE 6

A pellet/pellet PEN/PET (25/75) blend containing 10 weight % of poly(ethylene naphthalate-terephthalate) copolymer was processed with a Nissei® 250 (single stage) stretch blow molding machine and clear 32 ounce wide mouth (83 mm finish) containers containing <5% haze were produced. These clear containers had excellent sidewall material distribution and oxygen transmission rate of 23 ul/day at 23° C. with 100% RH on the inside of the container and 50% on the outside (a PET container would have about 30 ul/day and a PEN container would have about 6 ul/day oxygen transmission rates under these conditions).

The invention has been described in detail with particular reference to preferred embodiments thereof, but it will be understood that variations and modifications can be effected within the spirit and scope of the invention.

We claim:

1. A clear polymer blend containing less than 10% haze comprising
   (A) about 15 to about 80 weight % of poly(ethylene terephthalate),
   (B) about 80 to about 5 weight % of poly(ethylene naphthalenedicarboxylate), and
   (C) about 5 to about 15 weight % of a copolyester which comprises
      (1) an acid component comprising repeating units of from about 10 to about 20 mole % terephthalic acid and about 80 to about 90 mole % naphthalenedicarboxylic acid, and
      (2) a glycol component comprising repeating units of ethylene glycol,
   wherein the total mole % of acid component and glycol component in the copolyester are each 100 mole %.

2. The polymer blend of claim 1 wherein component (A) is present in an amount of about 35 to about 60%, component (B) is present in an amount of about 30 to about 60%, and component (C) is present in an amount of about 5 to about 10%.

3. The polymer blend of claim 1 wherein said copolyester of component (C) has an acid component of about 15 mole % from terephthalic acid and about 85 mole % from 2,6-naphthalenedicarboxylic acid; and has a glycol component of about 100 mole % from ethylene glycol.

4. The polymer blend of claim 1 wherein the poly(ethylene naphthalenedicarboxylate) of component (B) is poly(ethylene 2,6-naphthalenedicarboxylate) and the naphthalenedicarboxylic acid of component (C) is 2,6-naphthalenedicarboxylic acid.

5. The polymer blend of claim 1 wherein component (A) has an inherent viscosity of at least about 0.65, component (B) has an inherent viscosity of at least about 0.65, and component (C) has an inherent viscosity of at least about 0.65, wherein the inherent viscosities are determined at 25° C. in 60/40 (wt./wt.) phenol/tetrachloroethane at a concentration of 0.5 g/100 ml.

6. The polymer blend of claim 1 wherein component (A) has an inherent viscosity of at least about 0.75, component (B) has an inherent viscosity of at least about 0.75, and component (C) has an inherent viscosity of at least about 0.75, wherein the inherent viscosities are determined at 25° C. in 60/40 (wt./wt.) phenol/tetrachloroethane at a concentration of 0.5 g/100 ml.

7. The polymer blend of claim 1 wherein component (A) is modified with up to 10 mole % of at least one dicarboxylic acid other than terephthalic acid having 8 to 20 carbon atoms, at least one glycol other than ethylene glycol having 3 to 12 carbon atoms or a mixture thereof; component (B) is poly(ethylene 2,6-naphthalenedicarboxylate) which is modified with up to 10 mole % of at least one dicarboxylic acid other than 2,6.naphthalenedicarboxylic acid having 8 to 20 carbon atoms, at least one glycol other than ethylene glycol having 3 to 12 carbon atoms, or a mixture thereof.

8. The polymer blend of claim 1 wherein component (C) comprises
   (1) an acid component comprising repeating units of from about 10 to about 20 mole % terephthalic acid, about 80 to about 90 mole % 2,6-naphthalenedicarboxylic acid, and up to about 10 mole % of at least one dicarboxylic acid other than terephthalic acid and 2,6-naphthalenedicarboxylic acid having 8 to 20 carbon atoms, and
   (2) a glycol component comprising repeating units of ethylene glycol, and up to about 10 mole % of at least one glycol other than ethylene glycol having 3 to 12 carbon atoms.

9. The polymer blend of claim 7 wherein component (C) comprises
   (1) an acid component comprising repeating units of from about 10 to about 20 mole % terephthalic acid, about 80 to about 90 mole % 2,6-naphthalenedicarboxylic acid, and up to about 10 mole % of at least one dicarboxylic acid other than terephthalic acid and 2,6-naphthalenedicarboxylic acid having 8 to 20 carbon atoms, and
   (2) a glycol component comprising repeating units of ethylene glycol, and up to about 10 mole % of at least one glycol other than ethylene glycol having 3 to 12 carbon atoms.

10. The polymer blend of claim 7 wherein said other dicarboxylic acid for component (A) is isophthalic, adipic, glutaric, azelaic, sebacic, fumaric, biphenyldicarboxylic, cyclohexanedicarboxylic, or stilbenedicarboxylic; said other glycol for component (A) is 1,4-butanediol, 1,6-hexanediol, 1,4-cyclohexanedimethanol, or 2,2-dimethyl-1,3-propanediol; said other dicarboxylic acid for component (B) is isophthalic, glutaric, azelaic, sebacic, fumaric, cyclohexanedicarboxylic, stilbenedicarboxylic, or adipic, and said other glycol for component (B) is 1,4-butanediol, 1,4-cyclohexanedimethanol, 1,6-hexanediol, or 2,2-dimethyl-1,3-propanediol.

11. The polymer blend of claim 9 wherein said other dicarboxylic acid for component (A) is isophthalic, adipic, glutaric, azelaic, sebacic, fumaric, biphenyldicarboxylic, cyclohexanedicarboxylic, or stilbenedicarboxylic; said other glycol for component (A) is 1,4-butanediol, 1,6-hexanediol, 1,4-cyclohexanedimethanol, or 2,2-dimethyl-1,3-propanediol; said other dicarboxylic acid for component (B) is isophthalic, glutaric, azelaic, sebacic, fumaric, cyclohexanedicarboxylic, stilbenedicarboxylic, or adipic, said other glycol for component (B) is 1,4-butanediol, 1,4-cyclohexanedimethanol, 1,6-hexanediol, or 2,2-dimethyl-1,3-propanediol; said other dicarboxylic acid for component (C)(1) is isophthalic, cyclohexanedicarboxylic, stilbenedicarboxylic, glutaric, azelaic, sebacic, fumaric, biphenyldicarboxylic or adipic, and said other glycol for component (C)(2) is 1,4-butanediol, 1,4-cyclohexanedimethanol, 1,6-hexanediol, or 2,2-dimethyl-1,3-propanediol.

12. The polymer blend of claim 1 containing less than 5% haze.

13. The polymer blend of claim 2 containing less than 5% haze.

14. The polymer blend of claim 3 containing less than 5% haze.

15. The polymer blend of claim 4 containing less than 5% haze.

16. The polymer blend of claim 7 containing less than 5% haze.

17. The polymer blend of claim 8 containing less than 5% haze.

18. The polymer blend of claim 9 containing less than 5% haze.

19. The polymer blend of claim 10 containing less than 5% haze.

20. The polymer blend of claim 11 containing less than 5% haze.

* * * * *